United States Patent
Patin et al.

(10) Patent No.: US 8,857,863 B1
(45) Date of Patent: Oct. 14, 2014

(54) METHOD AND APPARATUS FOR CONNECTING CONDUIT

(75) Inventors: Darrin Patin, Broussard, LA (US); Thomas J. Fanguy, Broussard, LA (US); Ron C. Hill, Broussard, LA (US)

(73) Assignee: Supreme Service & Specialty Co., Inc., Houma, LA (US)

( * ) Notice: Subject to any disclaimer, the term of this patent is extended or adjusted under 35 U.S.C. 154(b) by 638 days.

(21) Appl. No.: 13/197,503

(22) Filed: Aug. 3, 2011

Related U.S. Application Data (60) Provisional application No. 61/370,568, filed on Aug. 4, 2010.

(51) Int. Cl.
*F16L 19/00* (2006.01)

(52) U.S. Cl.
USPC ............. 285/386; 285/354; 285/38; 285/91; 29/456

(58) Field of Classification Search
USPC .............. 285/386, 354, 38, 91, 92; 29/456
See application file for complete search history.

(56) References Cited

U.S. PATENT DOCUMENTS

| | | | | |
|---|---|---|---|---|
| 183,699 | A * | 10/1876 | Owens | 285/354 |
| 184,723 | A * | 11/1876 | Parsons | 285/354 |
| 327,737 | A * | 10/1885 | Strong | 285/38 |
| 396,550 | A * | 1/1889 | Dill et al. | 285/38 |
| 1,128,474 | A * | 2/1915 | Martz | 285/91 |
| 1,223,645 | A * | 4/1917 | Van Epps | 285/91 |
| 1,268,259 | A * | 6/1918 | Martin | 285/354 |
| 1,286,819 | A * | 12/1918 | Snyder | 285/91 |
| 1,504,662 | A * | 8/1924 | White | 285/91 |
| 1,519,111 | A * | 12/1924 | Brownell | 285/91 |
| 1,526,960 | A * | 2/1925 | Brownell | 285/91 |
| 2,333,243 | A * | 11/1943 | Glab | 285/33 |
| 2,417,025 | A * | 3/1947 | Volpin | 285/91 |
| 2,557,495 | A * | 6/1951 | Bily | 285/354 |
| 2,726,104 | A * | 12/1955 | Boitnott et al. | 285/354 |
| 3,248,135 | A | 4/1966 | Meripol | |
| 3,999,781 | A * | 12/1976 | Todd | 285/354 |
| 4,037,864 | A | 7/1977 | Anderson et al. | |
| 4,136,897 | A | 1/1979 | Haluch | |
| 4,575,044 | A * | 3/1986 | Gentry | 285/354 |
| 4,775,170 | A | 10/1988 | Usui et al. | |
| 4,776,618 | A | 10/1988 | Barree | |
| 4,802,695 | A * | 2/1989 | Weinhold | 285/354 |
| 5,340,163 | A | 8/1994 | Merrer et al. | |
| 5,988,690 | A | 11/1999 | Bogard | |
| 6,089,623 | A | 7/2000 | Schroeder et al. | |
| 6,116,658 | A | 9/2000 | Bohlen | |
| 6,578,881 | B2 * | 6/2003 | Lynn et al. | 285/354 |
| 6,764,109 | B2 * | 7/2004 | Richardson et al. | 285/354 |
| 6,962,321 | B1 | 11/2005 | Savage et al. | |
| 7,309,084 | B2 * | 12/2007 | Cooke, Jr. | 285/354 |
| 7,350,828 | B2 | 4/2008 | Williams | |
| 7,434,848 | B2 * | 10/2008 | Boyd | 285/91 |
| 7,793,994 | B2 * | 9/2010 | Boyd | 285/354 |
| 7,963,572 | B2 * | 6/2011 | Bull et al. | 285/386 |
| 8,096,590 | B2 * | 1/2012 | Nakao | 285/354 |

* cited by examiner

*Primary Examiner* — David E Bochna (57) ABSTRACT

A method and apparatus used for connecting adjoining conduit segments in oil and gas well operations is disclosed. The apparatus and method discloses use of a receptacle assembly attached to one conduit segment and stinger assembly attached to a second conduit segment. A rotatable wheeled hub threadably joins the stinger assembly to the receptacle assembly. The conduit connection ends of the stinger assembly and the receptacle assembly may be configured to accommodate a variety of common types of conduit connections such as Chiksan, hose, pipe, tubing, casing, flanges, hubs and other conduits for conveying media.

22 Claims, 9 Drawing Sheets

METHOD AND APPARATUS FOR CONNECTING CONDUIT

PRIORITY

This application claims priority to U.S. provisional application entitled "Method and Apparatus for Connecting Conduit Quickly and Without Tools" bearing Ser. No. 61/370,568 filed Aug. 4, 2010, the entire content of which is hereby incorporated by reference.

FIELD OF THE INVENTION

This invention relates generally to methods and apparatus used for connecting conduit used in oil and gas well operations and more particularly to a method and apparatus to quickly and safely connect a variety of common types of conduct including loading arms, hoses, pipe, tubing, casing, flanges, hubs and other such conduit without the need for tools.

BACKGROUND

Oil and gas well completion operations requires that conduit, such as loading arms, hoses, pipe, tubing, casing, flanges and hubs, be connected together. There are a variety of connection devices and tools used connecting such conduit. Various factors contribute the relative effectiveness of these existing connection systems. These factors include the speed associated with making the connection, resulting integrity of the conduit connection, the necessity for and availability of connection tools, and the concern for safety and well-being of the workers, the well, and the associated well equipment. These various factors, together and separately, may contribute to increased rig use time and as result increase the cost of well operations.

Consequently, a need exists for an improved conduit connecting apparatus and method that will serve to provide for reduced rig time, a reduction in connection sealing problems, and an increase in the safety of workers, the well, and the well equipment over that currently encountered or utilized.

SUMMARY OF THE INVENTION

The present invention relates to a method and apparatus which can be used to quickly and safely connect a variety of conduit without the need for tools. The present invention is suitable for and adaptable for use with a variety of connection devices, including but not limited to Chiksan swivel couplings, hammer unions, and connections or unions for loading arms, hoses, pipe, tubing, casing, flanges, and hubs.

The connection apparatus is comprised of a stinger assembly, a stinger receptacle assembly, and a centrally positioned collar assembly for threadably holding the stinger assembly and the stinger receptacle assembly together. The stinger assembly and the stinger receptacle assembly each have an end distal from the collar assembly that may be adapted as desired for connection to a desired conduit such as a hose, pipe, loading arm, flange, or the like. The versatility of the apparatus is enhanced by the ability to adapt the apparatus to connect a variety of conduit types including but not limited to Chiksan and hose, Chiksan and flange, hose and pipe, and the like.

The device is intended for use in connecting and disconnecting various types of conduit segments including high pressure hoses and piping. It is intended to replace the need for hammer union connections typically used in oil and gas operations for connection of hoses and piping. Such hammer unions require the use of heavy hammers to make a good connection and is physically demanding. Hammering on unions may cause foreign material or steel slags to become airborne. Hammering on unions may also cause sparks. Care must be taken by the user to strike only the makeup lugs when making a connection in order to avoid damage to the union nut. The union may be damaged or fractured by excessive hammering or other misuse.

Installation of a hammer typically requires the use of proper tools. For instance, soft-type hammers are often recommended for installation of such hammer unions and steel headed hammers should be avoided. The workers must be properly instructed and trained in the use of hammer union connections. Safety concerns require that each union be visually inspected prior to use for damage, unusual or excessive wear, excessive hammering, cracks, wash or erosion, corrosion or etching, thread or seal damage or other abnormalities.

The proposed device eliminates the need for hammer unions in most connections. Use of the device reduces the wear and tear on the connection, minimizes the risk of injury to the worker, and reduces the safety concerns associated with installation, due to sparking and the use of a damage connection due to improper inspection of the hammer union.

DESCRIPTION OF THE EMBODIMENT

Referring now to the drawings and more particularly to FIG. 1 through FIG. 4, the conduit connection apparatus (10) of the present invention is shown. The apparatus (10) includes a receptacle assembly (20) configured for receiving a stinger assembly (30). The receptacle assembly (20) and the stinger assembly (30) are held together by means of the centrally positioned collar assembly (40).

The receptacle assembly (20) is comprised of a longitudinally extending hollow cylindrical receptacle spool (25) and a conduit connector stub (28). The conduit connector stub (28) may be configured as desired for attachment to a desired tubing coupling. The periphery of the receptacle spool (25) is provided with a threaded union surface (23) and an extending lock flange (29) having bolt holes (24). The through-bore (27) of the receptacle spool (25) has a conically configured receptacle entrance (21) having a beveled sidewall (39). Weep holes (26) to the through-bore (27) are also provided.

Figure 1:
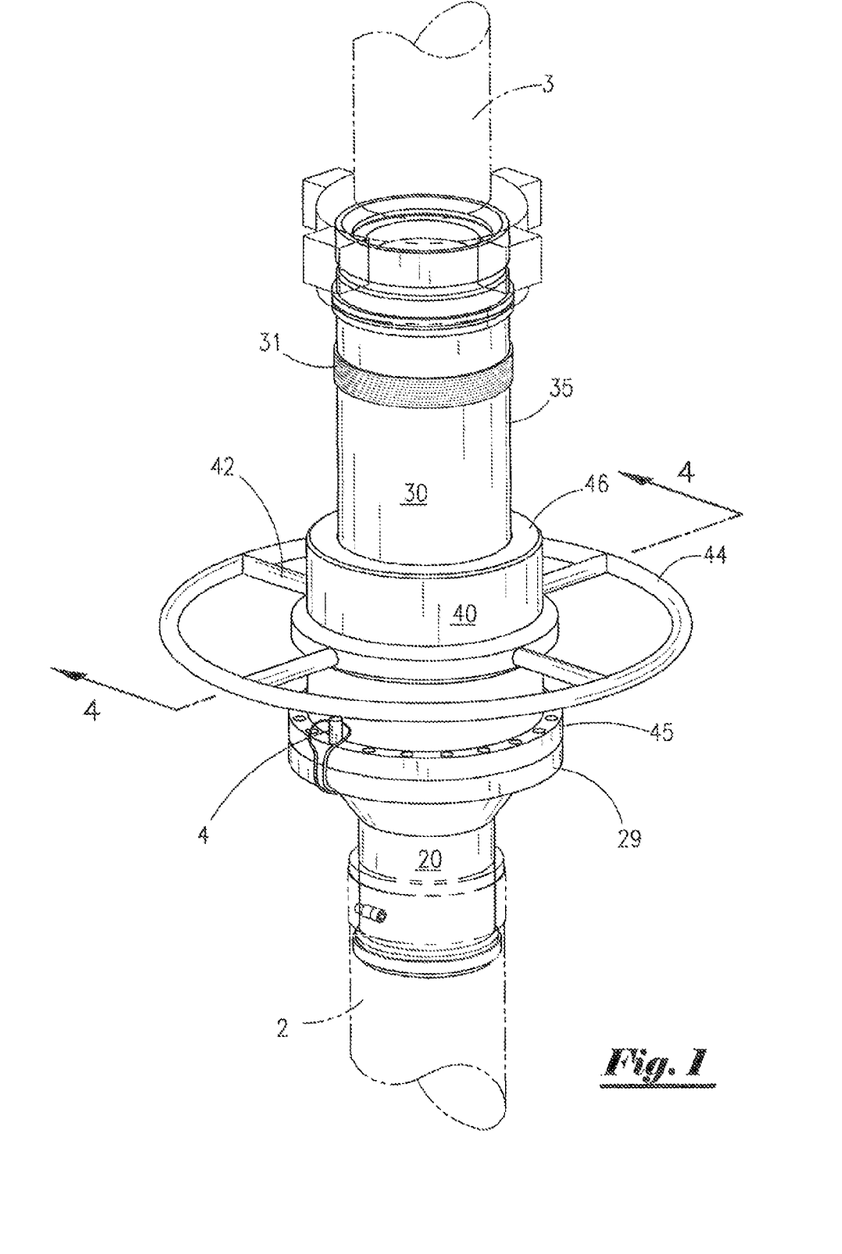
FIG. 1 is a perspective view of the connection apparatus' and assembly of the present invention.
Figure 2:
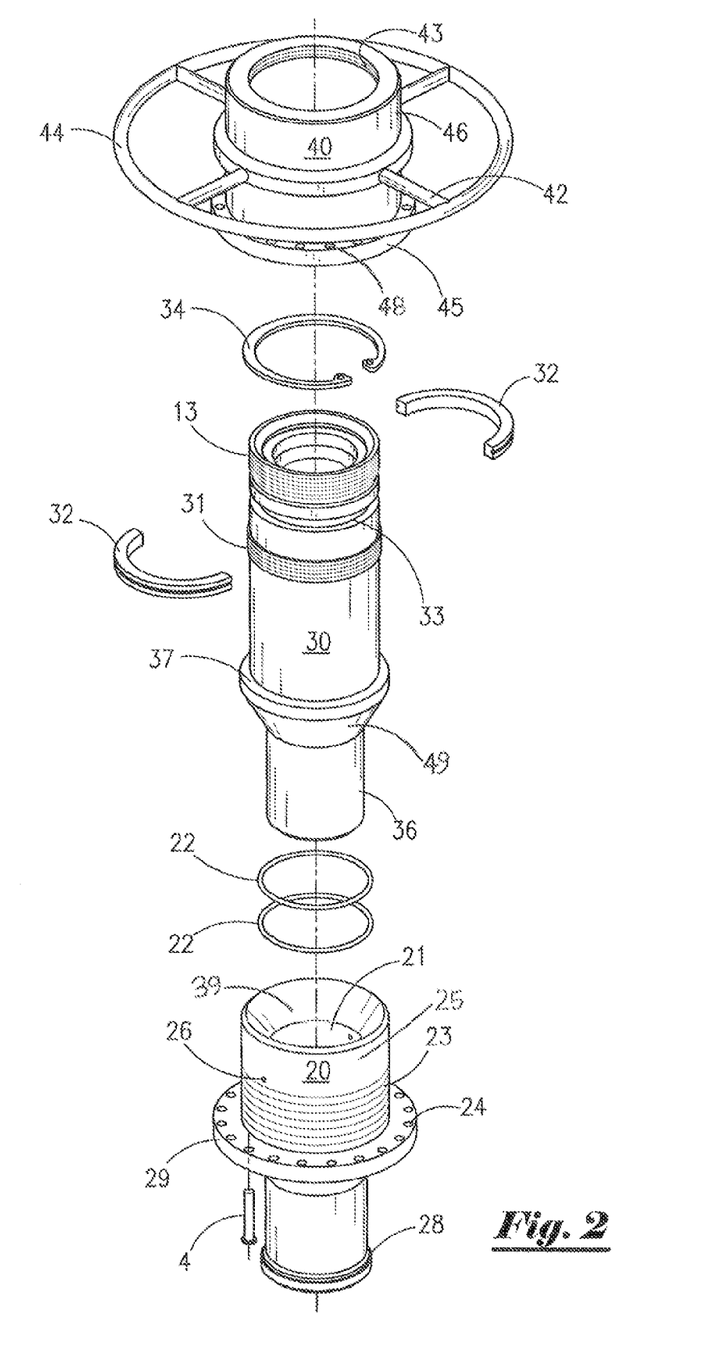
FIG. 2 is an exploded view of the connection apparatus and assembly shown in FIG. 1.

The stinger assembly (30), as shown in FIG. 1 and FIG. 2, is of a generally longitudinally extending hollow cylindrical configuration comprised of a longitudinally extending stinger spool (35) having a through-bore (38) that corresponds with the through-bore (27) of the receptacle assembly (20). The stinger spool (35) has at one end an adaptive connection (13) that may be adapted as desired for connection with a conduit segment such as the threaded conduit union shown. The stinger spool (35) has, at the opposite end, an elongated pin end or stinger (36). A threaded collar union surface (31) is provided around the stinger spool (35) for attachment to the collar assembly (40). A ring groove (33) on the periphery of the stinger spool (35) retaining ring stops (32) that are held in place around the groove (33) by a snap ring (34).

Positioned between the stinger spool (35) and the stinger (36) is a radially extending conically configured collar stop shoulder (37). The stop shoulder (37) is configured to correspond to and mate with the conical entrance (21) of the receptacle spool (25).

The collar assembly (40) is comprised of a hollow generally cylindrical collar hub (46) having inwardly protruding shoulder surface (47). The collar hub (46) is provided with a plurality of radially extending spokes (42) that are threadably or otherwise connected to the collar hub (46) to support a collar wheel (44). Collar hub (46) has an internal threaded union surface (41) that corresponds with the threaded union surface (23) of the receptacle spool (25) and an internal threaded union surface (41) that corresponds with the threaded collar union surface (31) of the stinger spool (35).

Around the periphery of the collar hub (46) is a radially extending conically shaped flange (45) that corresponds with extending lock flange (29) of the receptacle spool (25) of the receptacle assembly (20). The flange (45) of the collar hub (46) has at least one bolt hole (48) that corresponds with at least one of the bolt holes (24) in the lock flange (29) of the receptacle assembly (20). The conically shaped flange (45) also has a beveled edge or seat (49) configured to correspond with the sidewall (39) of the receptacle entrance (21). A wire locking pin assembly (4) or other type of clevis pin is inserted into the receptacle bolt hole (24) and a corresponding collar bolt hole (48) to prevent unwanted rotation of the collar hub (46) on the receptacle spool (25).

Figure 3:
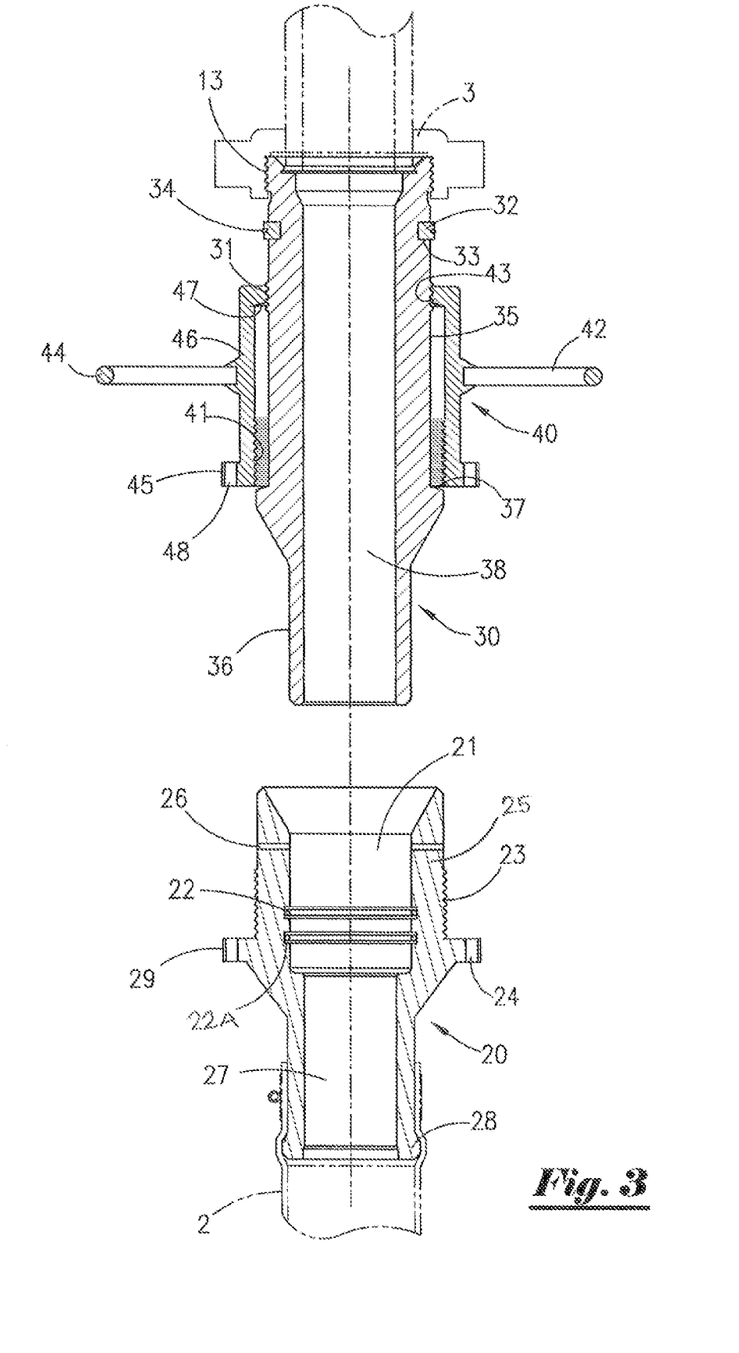
FIG. 3 is an exploded longitudinal cross-section view of the connection apparatus and assembly shown in FIG. 1.

As shown in FIG. 3, the collar assembly (40) is threadably mounted onto the stinger assembly (30) by means of the threaded collar union surface (31) on the stinger spool (35) and the threaded union surface (43) of the collar hub (46). The retaining ring stops (32) are inserted into the ring groove (33) around the periphery of the stinger spool (35) and held in place by snap ring (34). The retaining ring stops (32) and the collar shoulder surface (47) serve to retain the collar hub (46) on the stinger spool (35). The collar union surface (31) on the stinger spool (35) is configured to allow the collar hub (46) to be rotated off of the collar union surface (31) so that the hub may be slidably moved along the stinger spool (35) between the flange (37) and the retaining ring stops (32).

Figure 4:
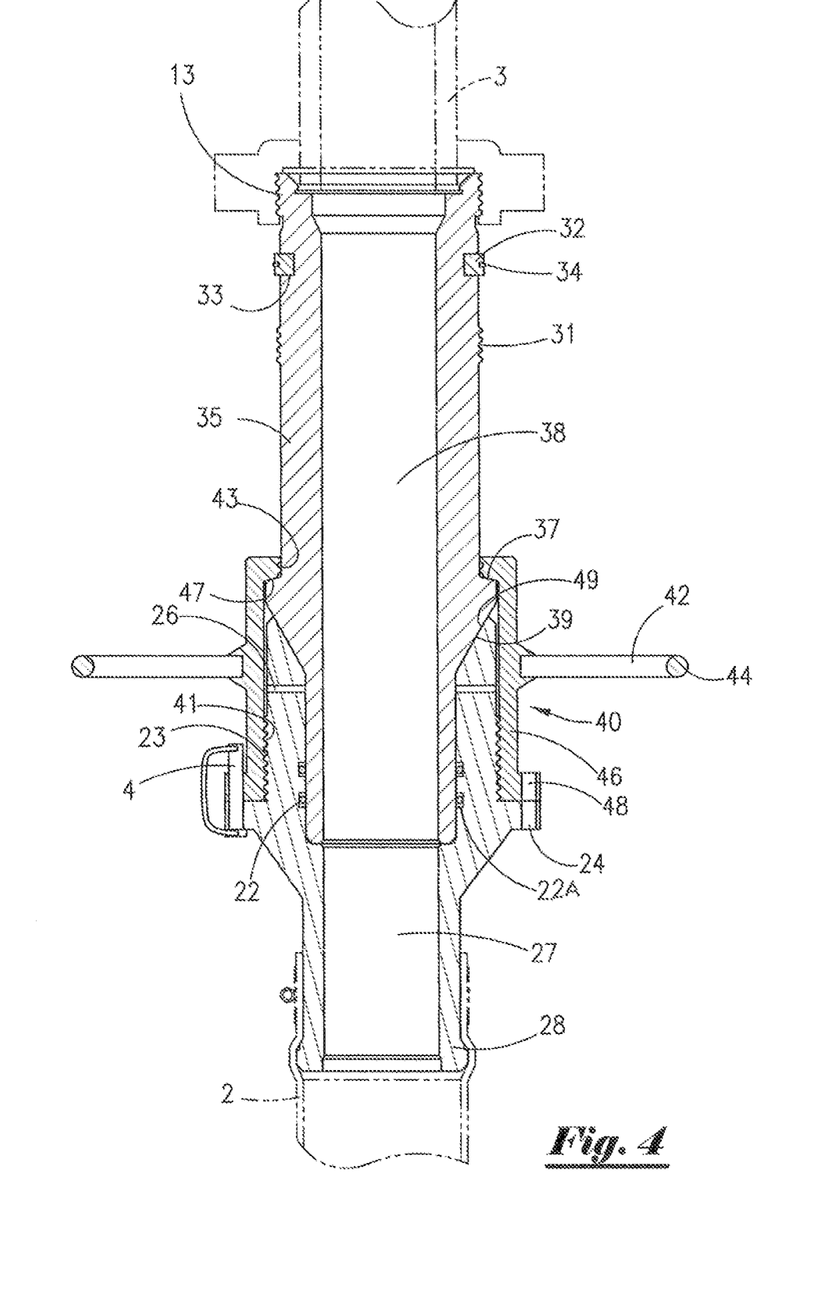
FIG. 4 is a longitudinal cross-section view of the connection apparatus and assembly shown in FIG. 1.

The makeup of a connection of conduit by means of the conduit connection apparatus (10) is shown in FIGS. 3 and 4. This accomplished by attaching a desired first conduit segment (3) of the stinger assembly (30) by means of the conduit connection end (13) of the stinger spool (35). The collar hub (46) of the collar assembly (40) is then rotated on the stinger spool (35) by means of the collar wheel (44) to engage the threaded collar union surface (31) of the stinger spool (35) with the internal threaded surface (43) of the stinger spool (35). A second desired second conduit segment (2) is attached to the receptacle assembly (20) by means of conduit connector stub (28) of the receptacle assembly (20).

The stinger (36) of the stinger assembly (30) is then inserted into the through-bore (27) of the receptacle spool (25) of the receptacle assembly (20) until the stop shoulder (37) of the stinger spool (35) mates with the conical entrance (21) of the receptacle spool (25). The handle (44) of the collar assembly (40) is the rotated to disengage the collar hub (46) from thread union surfaces on the stinger spool (35) so that it slides along the stinger spool (35) to allow engagement of the threaded union surface (41) of the collar hub (46) with the threaded union surface (23) of the receptacle spool (25). The collar hub may be so turned until the collar shoulder surface (47) is positioned against the collar stop shoulder (37) of the stinger assembly (30). The interior surface of the through-bore (27) of the receptacle assembly (20) has O-ring seals (22) positioned in groove seal seats (22A) to serve to insure the integrity of the connection.

This rotation of the collar hub (46) of the collar assembly (40) will releasably connect and seal the stinger assembly (30) to the receptacle assembly (20) and align through-bore (38) of the stinger assembly (30) with the through-bore (27) of the receptacle assembly (20). Then the wire locking pin assembly (4) is inserted into the receptacle bolt hole (24) and a corresponding collar bolt hole (48) to prevent unwanted rotation of the collar hub (46) on the receptacle spool (25) to complete the connection of the conduit segments (2) and (3) by the apparatus (10).

Use of the conduit connection apparatus (10) with the rotating collar hub (46) and associated collar wheel (44) of the collar assembly (40) in the described manner provides a hammerless union of adjoining conduit segments (2) and (3) and provides for conduit flow between the conduct segments (2) and (3) through the apparatus (10). Similarly, the conduit segments (2) and (3) may be readily disconnected from each other by rotating collar hub (46) in the opposite direction by means of collar wheel (44) to disengage threaded union surface (41) of the collar hub (46) from the threaded union surface (23) of the receptacle spool (25). The stinger (36) may then be withdrawn from the receptacle assembly (20).

The engagement and disengagement of the stinger assembly (30) from the receptacle assembly (20) by means of the collar assembly (40) as described above may be performed manually without the need for tools. The engagement and disengagement of the stinger assembly (30) and the receptacle assembly (20) may also be accomplished by the use of a tool such as a hydraulically or pneumatically activated spinner wrench or a strap wrench. In such a situation, the collar hub (46) may be provided with wrench flats or spinner lugs to accommodate the wrench faces of a spinner wrench or a strap wrench to effectuate the rotation of the collar hub (46) of the collar assembly (40) with respect to the receptacle assembly (20).

Inherent to the design of the present embodiment is the adaptive conduit connector stub (28) of the receptacle assembly (20) and the conduit connection end (13) of the stinger spool (35) of the stinger assembly (30). The receptacle conduit connector stub (28) and the conduit connection end (13) of the stinger assembly (30) can be any variation of Chiksan, hose, pipe, tubing, casing, flange, hub or any other type of connection found on various media-conveying conduit types.

In FIGS. 1-4 the conduit connection end (13) of the stinger assembly (30) is shown as having a hammer union type connector and the conduit connector stub (28) of the stinger assembly (20) is shown as having a hose type connector. Some of the various types of connection configurations that may be substituted for the conduit connection end (13) of the stinger assembly (30) are shown in FIGS. 5-9. It will be seen that similar types of connection configurations could be adopted for the conduit connector stub (28) of the receptacle assembly (20).

Figure 5:
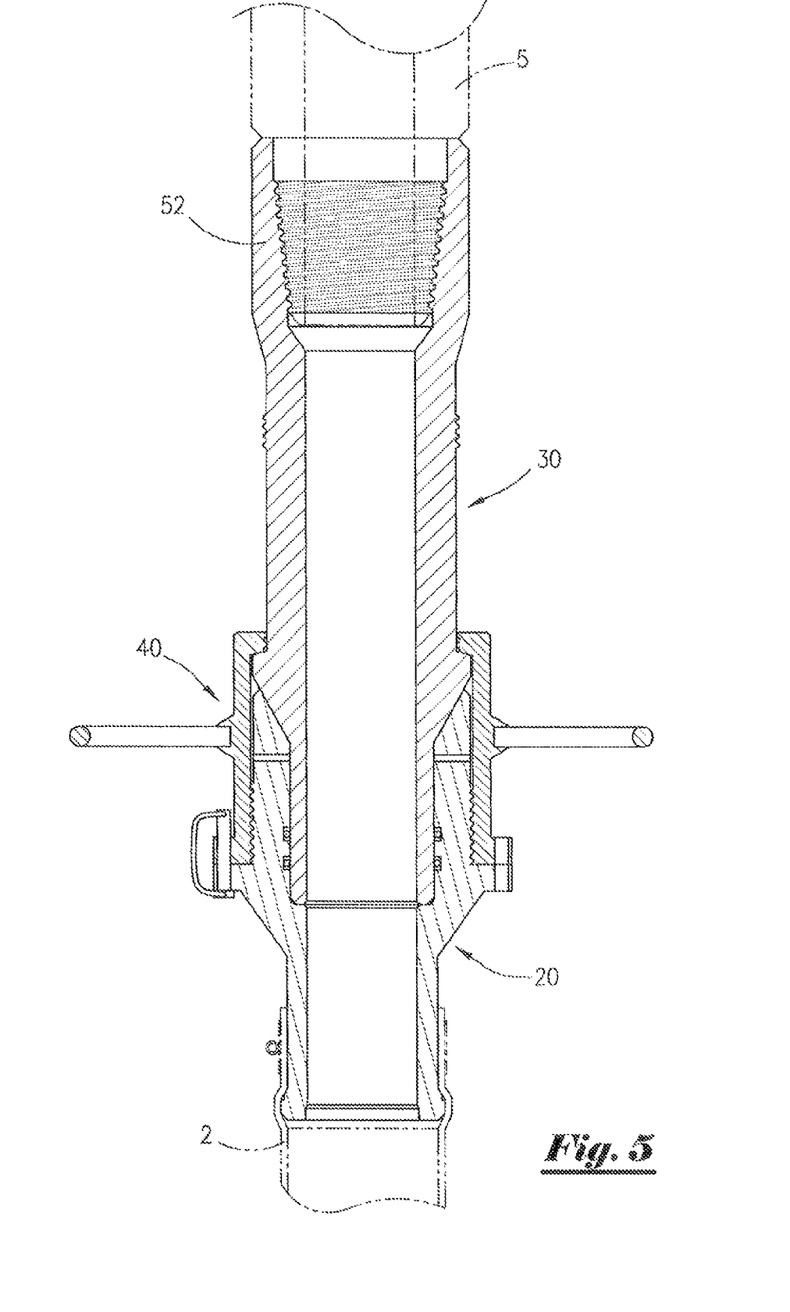
FIG. 5 through FIG. 9 are longitudinal cross-section views of the connection apparatus and assembly showing variously configured conduit end connections for the stinger spool of the stinger assembly.

As shown in FIG. 5, conduit connection end (52) of the stinger assembly (30) is shown configured as an internally threaded connection such as that as might be found on drill pipe (5).

Figure 6:
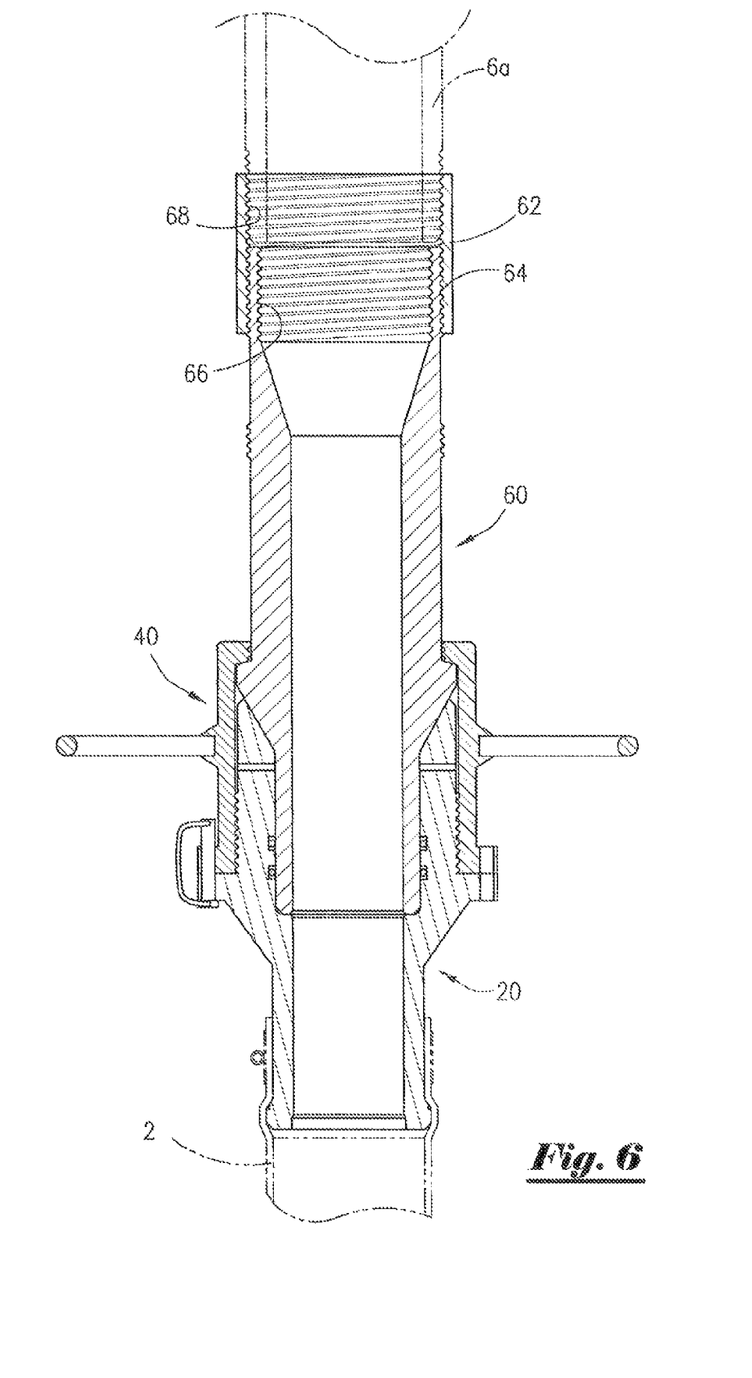

As shown in FIG. 6, the stinger assembly, there designated as (60), has a conduit connection end configured with external connection threads (64) and internal connections threads (66). As depicted, externally threaded pipe (6a) is attached to the stinger assembly (60) by means of a pipe collar (62) having internal connection threads (68) that engage the external threads of pipe (6a) and the external connection threads (64) of the stinger assembly (60) to complete the connection.

Figure 7:
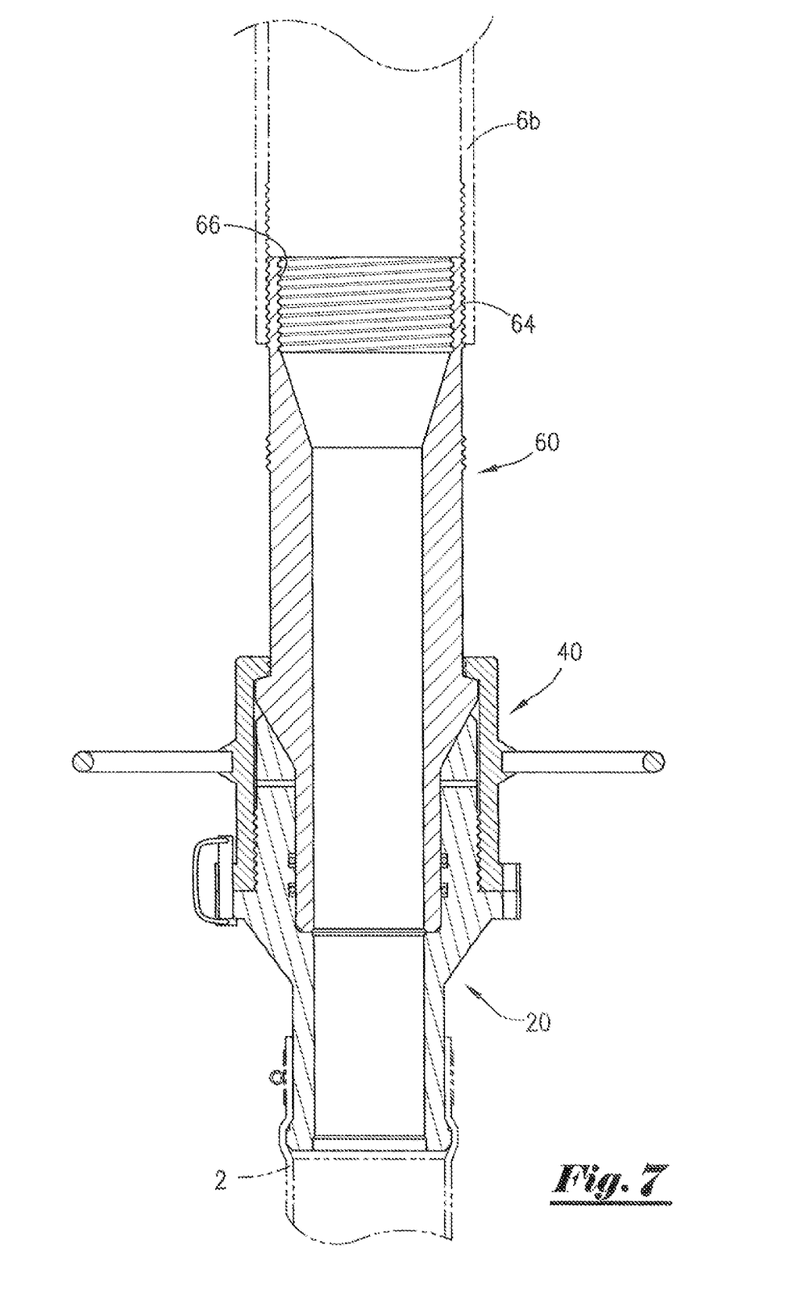

As shown in FIG. 7, the conduit connection of the stinger assembly (60) shown in FIG. 6 is connected with an internally threaded pipe (6b). The internal threads of the pipe (6b) engage with external threads (64) of the stinger assembly (60) to complete the connection.

Figure 8:
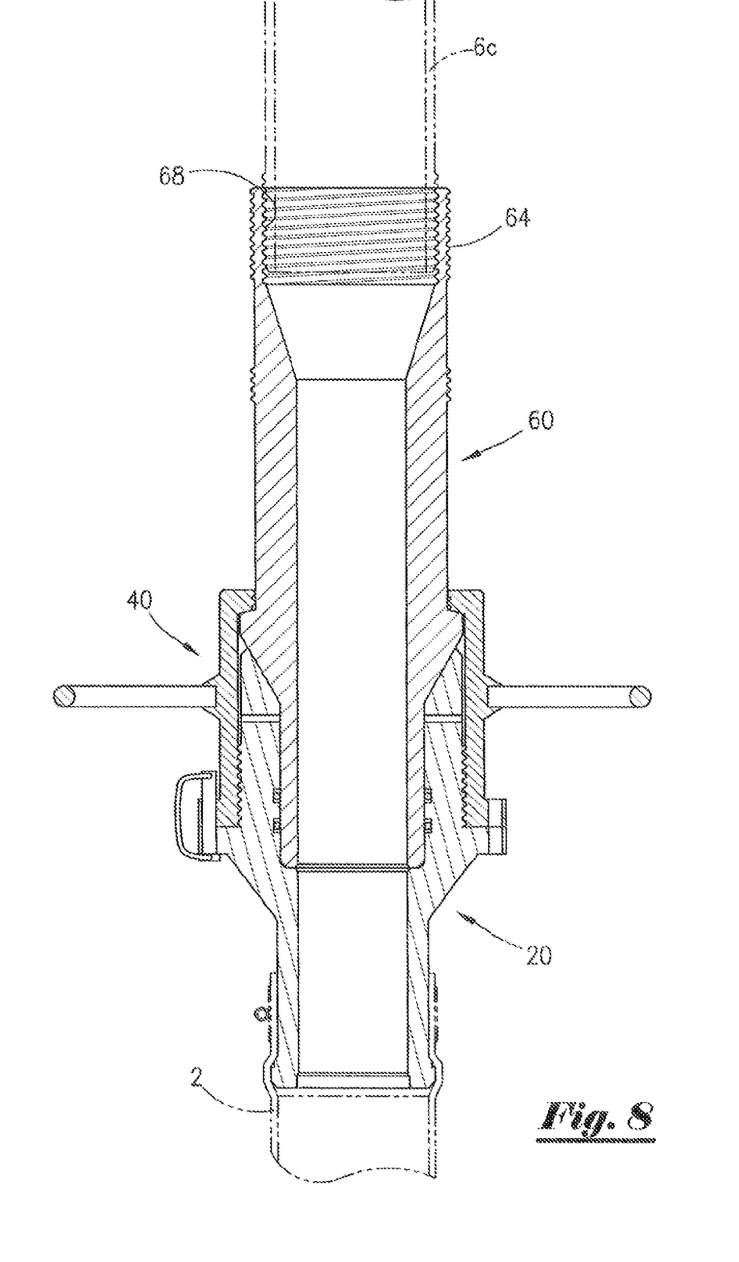

As shown in FIG. 8, the conduit connection of the stinger assembly (60) shown in FIG. 6 is connected with an externally threaded pipe (6c). The external threads of the pipe (6c) engage with internal threads (68) of the stinger assembly (60) to complete the connection.

Figure 9:
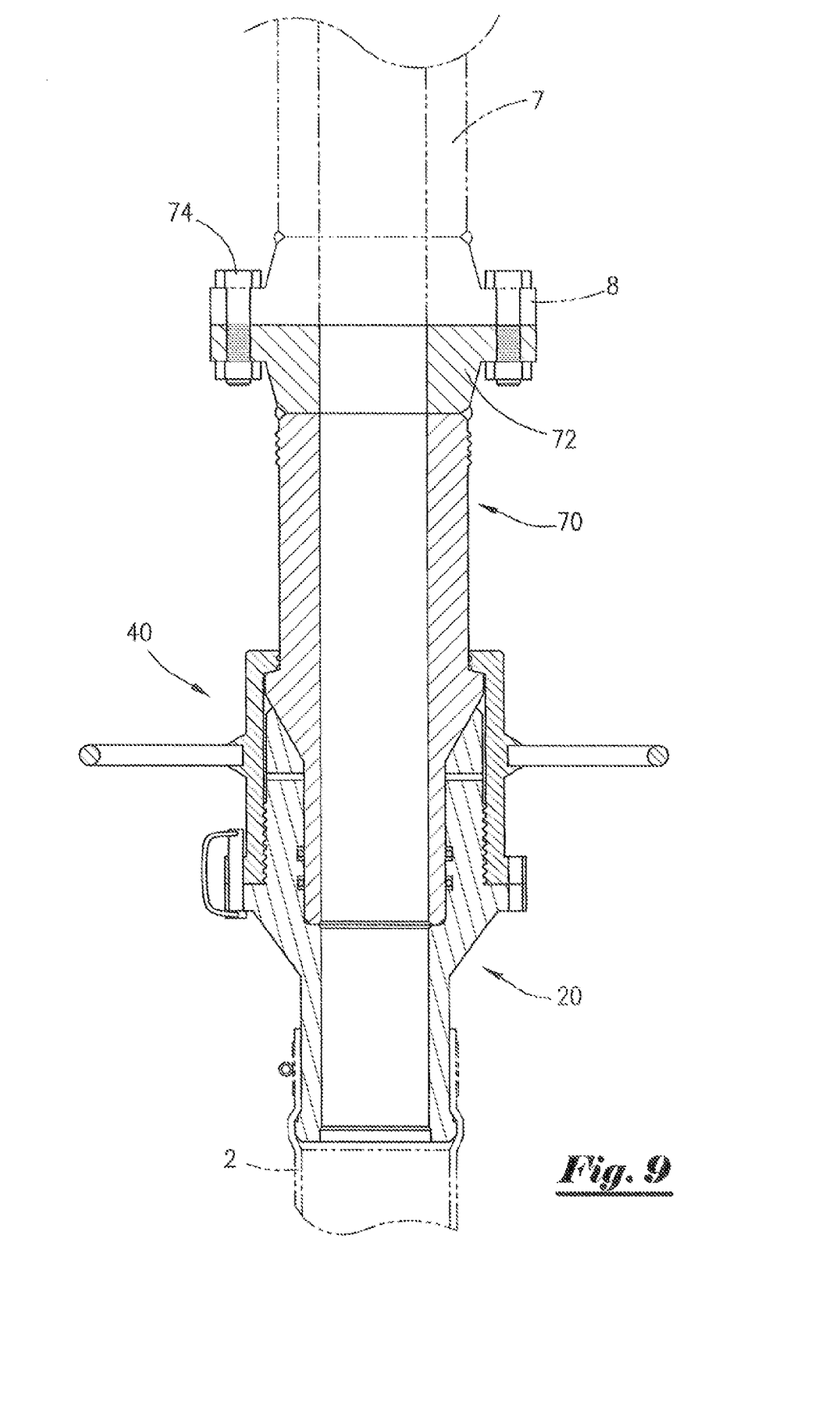

As shown in FIG. 9, the stinger assembly, there designated as (70), has a conduit connection end configured with a bolt flange (72) for receiving bolts (74). As depicted, a pipe (7) having a bolt flange (8) is attached to the stinger assembly (70) by means of the stinger bolt flange (72) and the pipe bolt flange (8) and the bolts (74).

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

We claim:

1. An apparatus for connecting conduit, comprising:
   (a) a cylindrical receptacle having a through-bore, a conically configured receptacle entrance in communication with said receptacle through-bore, a plurality of receptacle connector threads around the periphery of said receptacle, and a conduit connection end;
   (b) a stinger having a through-bore, a conically configured radially extending flange, a conduit connection end, and a threaded collar union surface;
   (c) a circular collar, said collar having a threaded stinger union surface to correspond with said threaded collar union surface of said stinger, said collar slidably engaged with said stinger, a plurality of collar connector threads around the internal periphery of said collar, said collar connector threads configured to correspond with said receptacle connector threads; and
   (d) means for rotating said collar whereby said collar connector threads may be engaged with said receptacle connector threads and thereby connect said stinger with said receptacle.

2. The apparatus as recited in claim 1 wherein, said means for rotating said collar is a wheel mounted around the periphery of said collar.

3. The apparatus as recited in claim 2, further comprising:
   (a) a first conduit connected to said conduit connection end of said stinger; and
   (b) a second conduit connected to said a conduit connection end of said receptacle.

4. The apparatus as recited in claim 3, further comprising:
   (a) a receptacle flange mounted around the periphery of said receptacle: said receptacle flange having a plurality of bolt holes;
   (b) a collar flange mounted around the periphery of said collar, said collar flange having a plurality of bolt holes; and
   (c) at least one pin mounted within said receptacle flange bolt holes and said collar flange bolt holes.

5. The apparatus as recited in claim 3 wherein said first conduit is connected to said conduit connection end of said stinger by neaps of a hammer union connection.

6. The apparatus as recited in claim 3 wherein said first conduit is connected to said conduit connection end of said stinger by means of a swivel connection.

7. The apparatus as recited in claim 3 wherein said first conduit is connected to said conduit connection end of said stinger by means of a threaded connection.

8. An apparatus for connecting conduit, comprising:
   (a) a cylindrical receptacle having a through-bore, a cortically configured receptacle entrance in communication with said receptacle through-bore, a plurality of receptacle connector threads around the periphery of said receptacle, a conduit connection end, and a radially extending receptacle flange having a plurality of bolt holes;
   (b) a cylindrical stinger having a through-bore, a conically configured radially extending flange, a conduit connection end, and a threaded collar union surface;
   (c) a circular collar, said collar having an inwardly protruding, shoulder, said collar shoulder having a threaded stinger union surface configured to correspond with said threaded collar union surface of said stinger, and a threaded receptacle union surface configured to correspond with said receptacle connector threads, and a radially extending collar flange having a plurality of bolt holes; and
   (d) means for rotating said collar whereby said threaded stinger union surface of said collar may first be engaged with said threaded collar union surface of said stinger and then said threaded receptacle union surface may engaged with said receptacle connector threads of said receptacle and thereby connect said stinger with said receptacle.

9. The apparatus as recited in claim 8 wherein, said means for rotating said collar is a wheel mounted around the periphery of said collar.

10. The apparatus as recited in claim 9, further comprising:
    (a) a first conduit connected to said conduit connection end of said stinger; and
    (b) a second conduit connected to said a conduit connection end of said receptacle.

11. The apparatus as recited in claim 10, further comprising a retaining ring stop around the periphery of said cylindrical stinger.

12. The apparatus as recited in claim 11, further comprising at least one pin mounted within said receptacle flange bolt holes and said collar flange bolt holes.

13. The apparatus as recited in claim 9 wherein said first conduit is connected to said conduit connection end of said stinger by means of a hammer union connection.

14. The apparatus as recited in claim 9 wherein said first conduit is connected to said conduit connection end of said stinger by means of a swivel connection.

15. The apparatus as recited in claim 9 wherein said first conduit is connected to said conduit connection end of said stinger by means of a threaded connection.

16. A method for connecting conduit, comprising the steps of:
    (a) providing a cylindrical receptacle, said receptacle having a through-bore, a conically configured receptacle entrance in communication with said receptacle through-bore, and a conduit connection end;

(b) providing a stinger having a through-bore, said stinger having a conically configured radially extending flange, a conduit connection end, and a threaded collar union surface;

(c) providing a circular collar slidably engaged with said stinger, said collar having a threaded stinger union surface to correspond with said threaded collar union surface of said stinger;

(d) providing means for rotational engagement of said stinger with said collar, (e) connecting a first conduit to said conduit connection end of said stinger;

(f) connecting a second conduit to said a conduit connection end of said receptacle, (g) inserting said stinger into said receptacle entrance whereby said through-bore of said receptacle is in communication with said through-bore of said stinger; and (h) rotating said collar for engagement with said stinger whereby a connection is made between said first conduit and said second conduit.

17. The method as recited in claim 16 wherein said step of connecting, said first conduit to said conduit connection end of said stinger includes a hammer union connection.

18. The method as recited in claim 16 wherein said step of connecting said first conduit to said conduit connection end of said stinger includes a swivel connection.

19. The method as recited in claim 16 wherein said step of connecting said first conduit to said conduit connection end of said stinger includes a threaded connection.

20. An apparatus for connecting conduit, comprising:

(a) a stinger having a through-bore, a conically configured radially extending flange, a threaded collar union surface, and a conduit connection end whereby a first conduit may be connected;

(b) a cylindrical receptacle having a through-bore said receptacle having an entrance whereby said stinger may be received within said receptacle, a plurality of receptacle connector threads around the periphery of said receptacle, and a conduit connection end whereby a second conduit may be connected; and (c) a rotatable collar said collar having a threaded stinger union surface engagable with said threaded collar union surface of said stinger, and a plurality of collar connector threads around the internal periphery of said collar, said collar connector threads engagable with said receptacle connector threads.

21. The apparatus for connecting conduit as recited in claim 20 further comprising at least one spoke connected to said collar whereby said collar may be rotated to engage and disengage said collar connector threads with said receptacle connector threads.

22. The apparatus for connecting conduit as recited in claim 20 wherein said collar may be rotated without a hammer to engage and disengage said collar connector threads with said receptacle connector threads.

* * * * *